Figure 16:
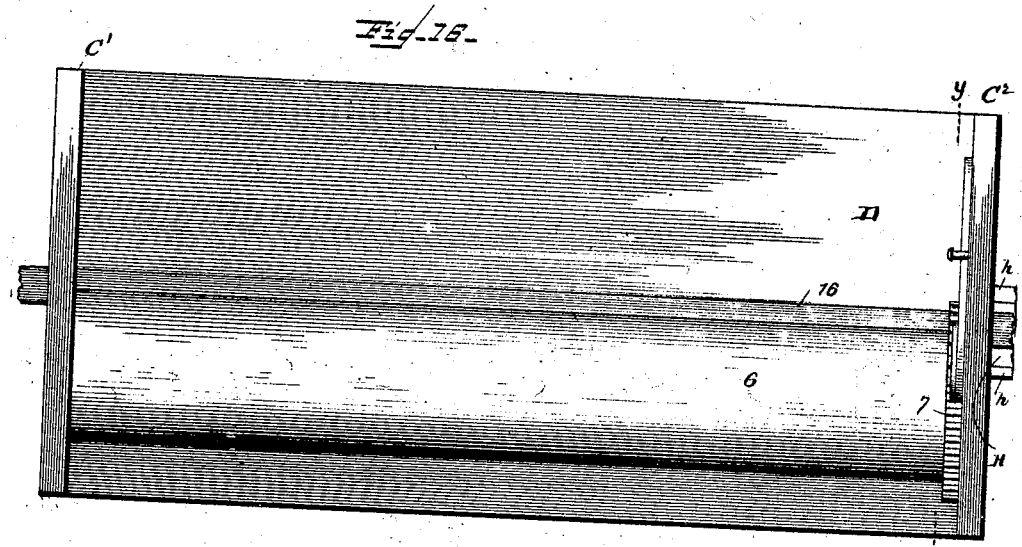

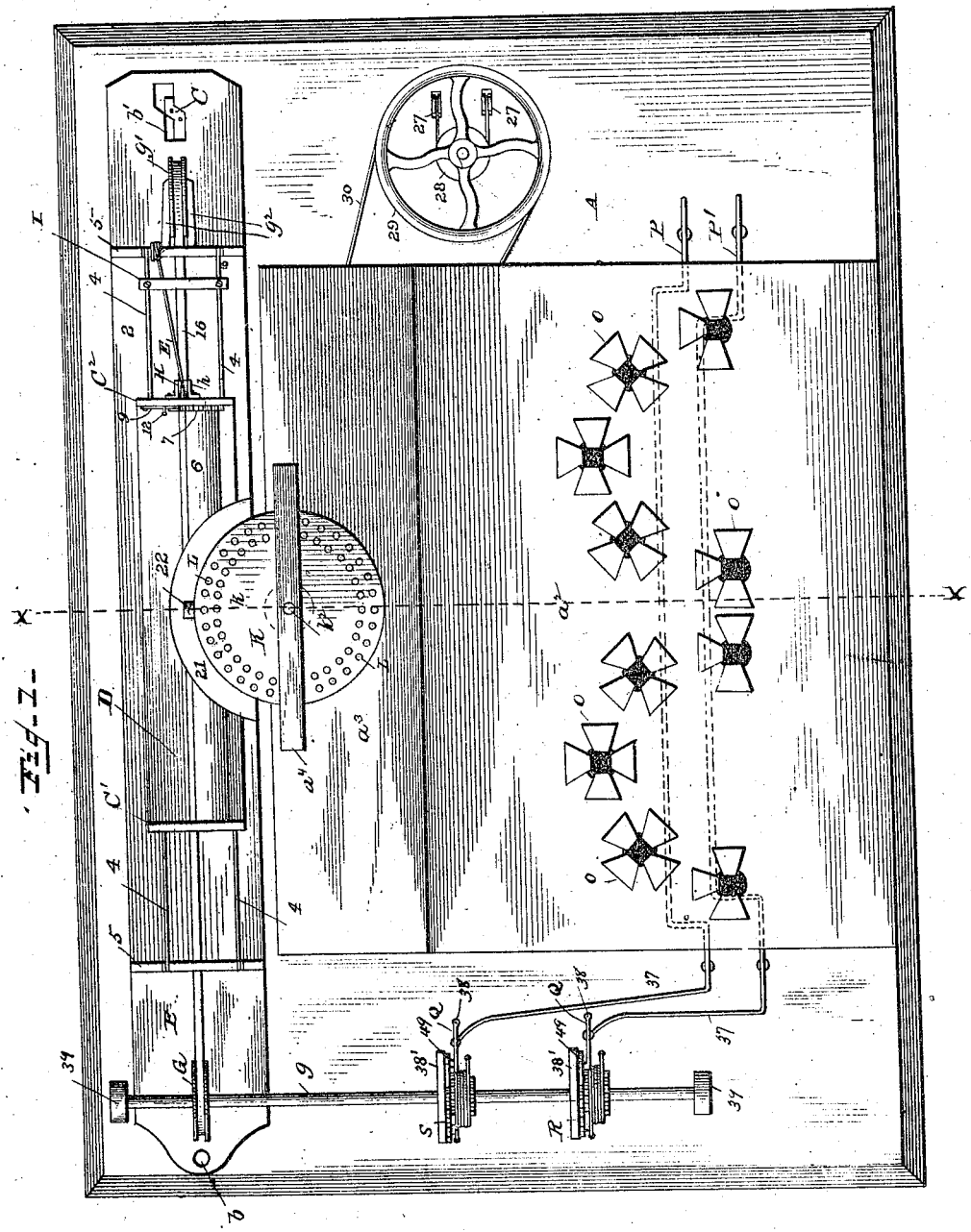

(No Model.)  
10 Sheets—Sheet 2.
D. A. MURRAY.
TYPE WRITING MACHINE.
No. 423,622.  
Patented Mar. 18, 1890.
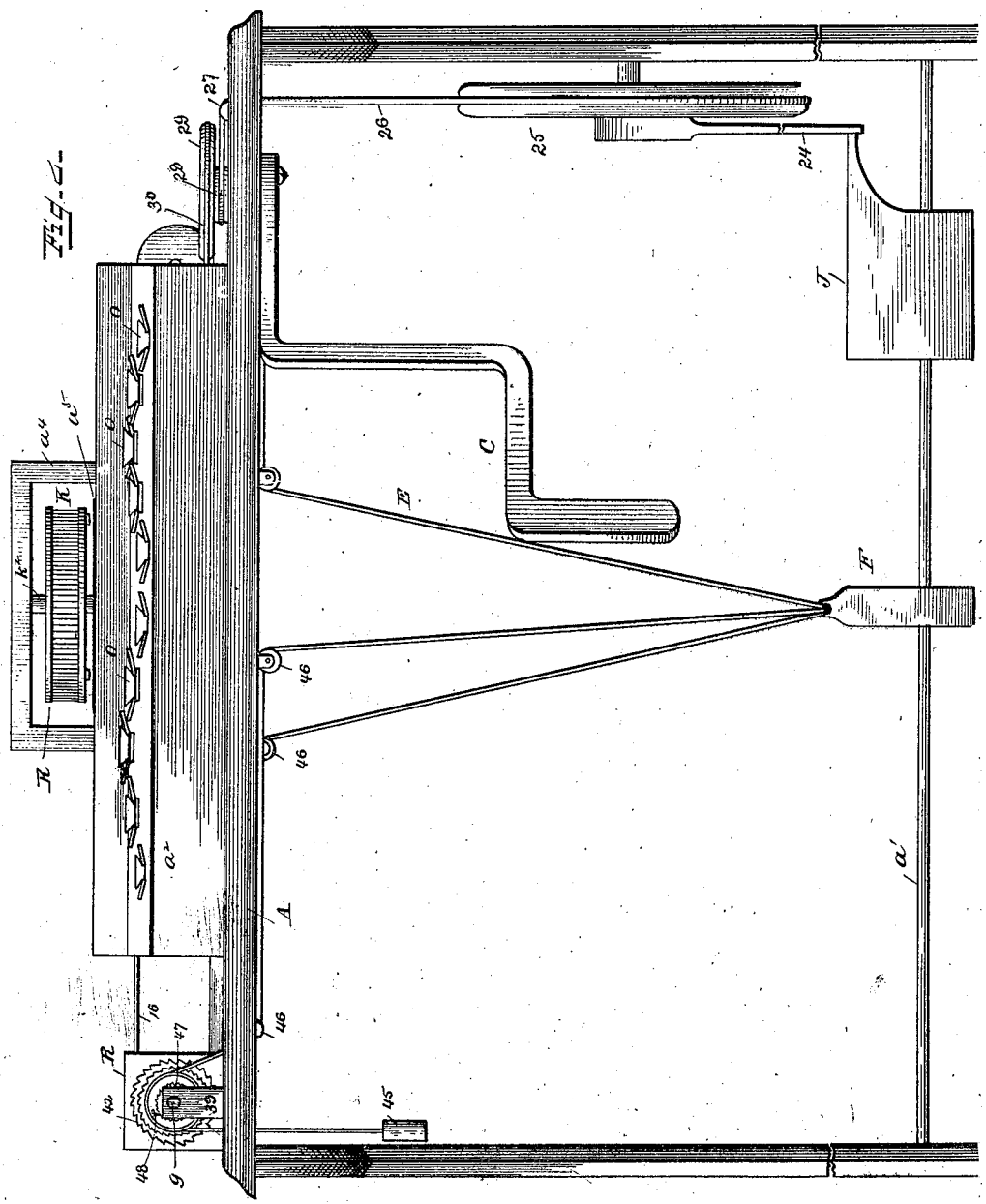
WITNESSES  
Edwin L. Yewell  
Wm. J. Littell
INVENTOR  
David A. Murray  
by J. R. Littell,  
Attorney (No Model.) D. A. MURRAY. 10 Sheets—Sheet 3.
TYPE WRITING MACHINE.
No. 423,622. Patented Mar. 18, 1890.
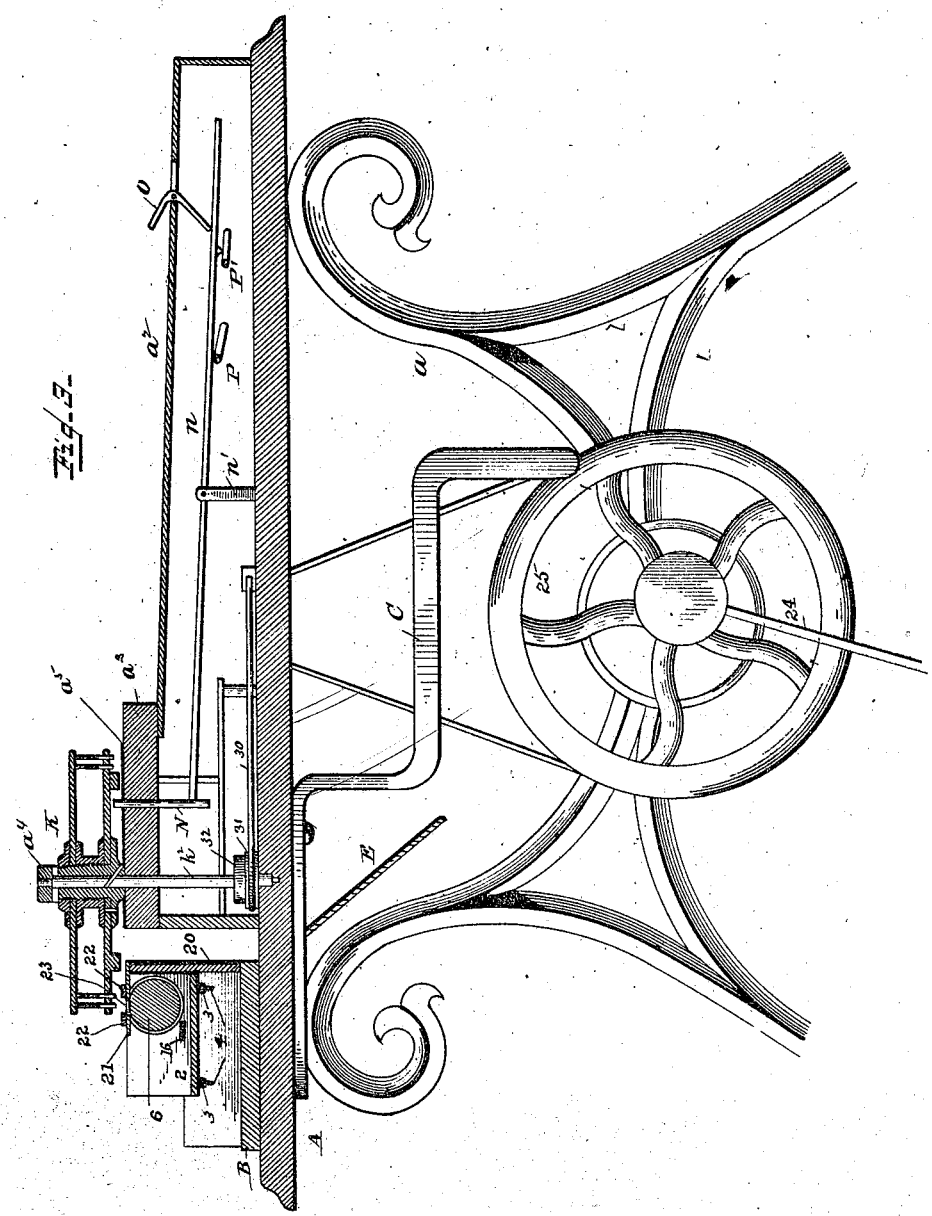
WITNESSES
Edwin L. Yewell,
Wm. J. Littell,
INVENTOR
David A. Murray
by J. R. Littell,
Attorney (No Model.) D. A. MURRAY. 10 Sheets—Sheet 4.
TYPE WRITING MACHINE.
No. 423,622. Patented Mar. 18, 1890.
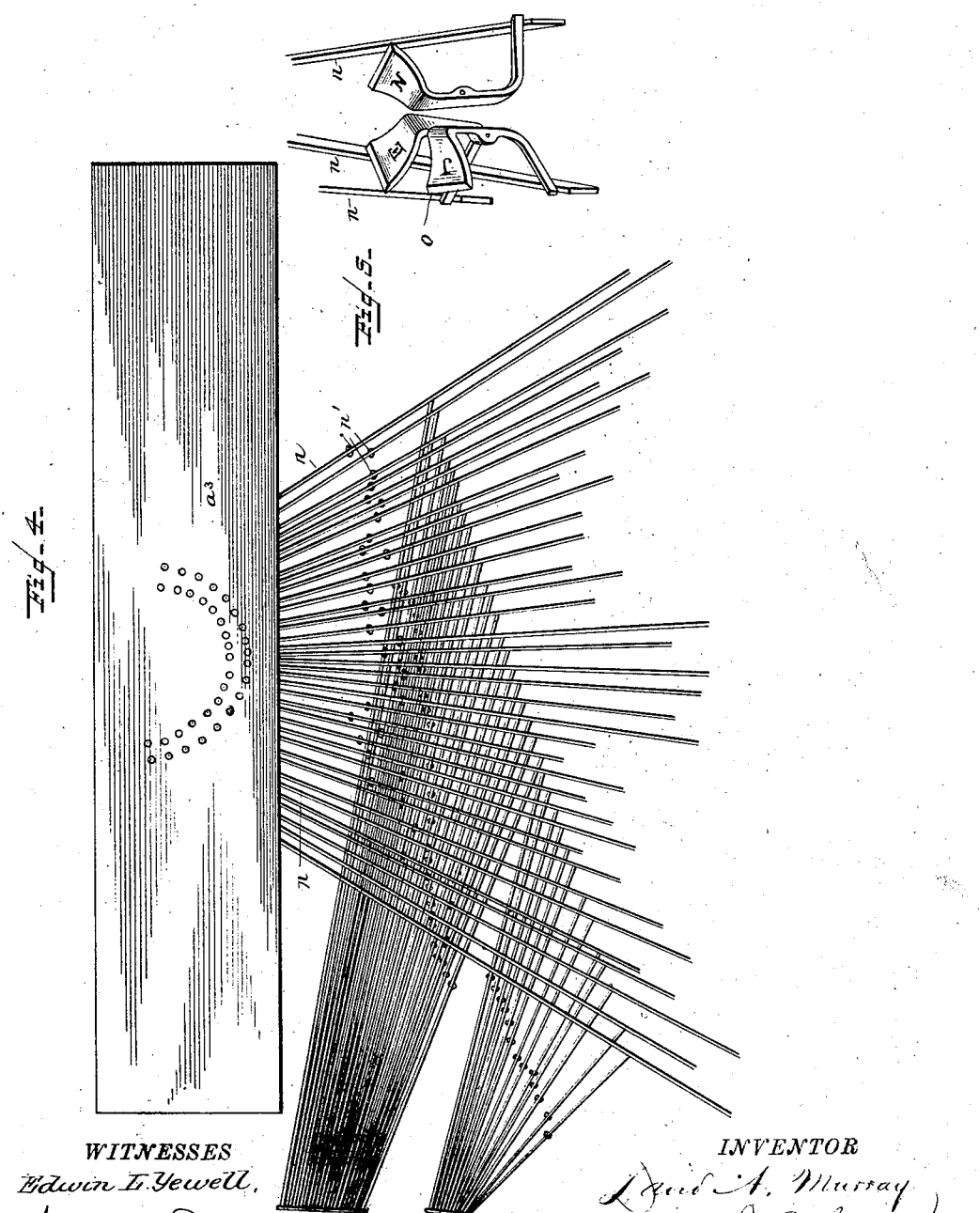
WITNESSES
Edwin L. Yewell
Wm. J. Littell
INVENTOR
David A. Murray
by J. R. Littell,
Attorney (No Model.)
D. A. MURRAY.
TYPE WRITING MACHINE.
No. 423,622.
10 Sheets—Sheet 5.
Patented Mar. 18, 1890.
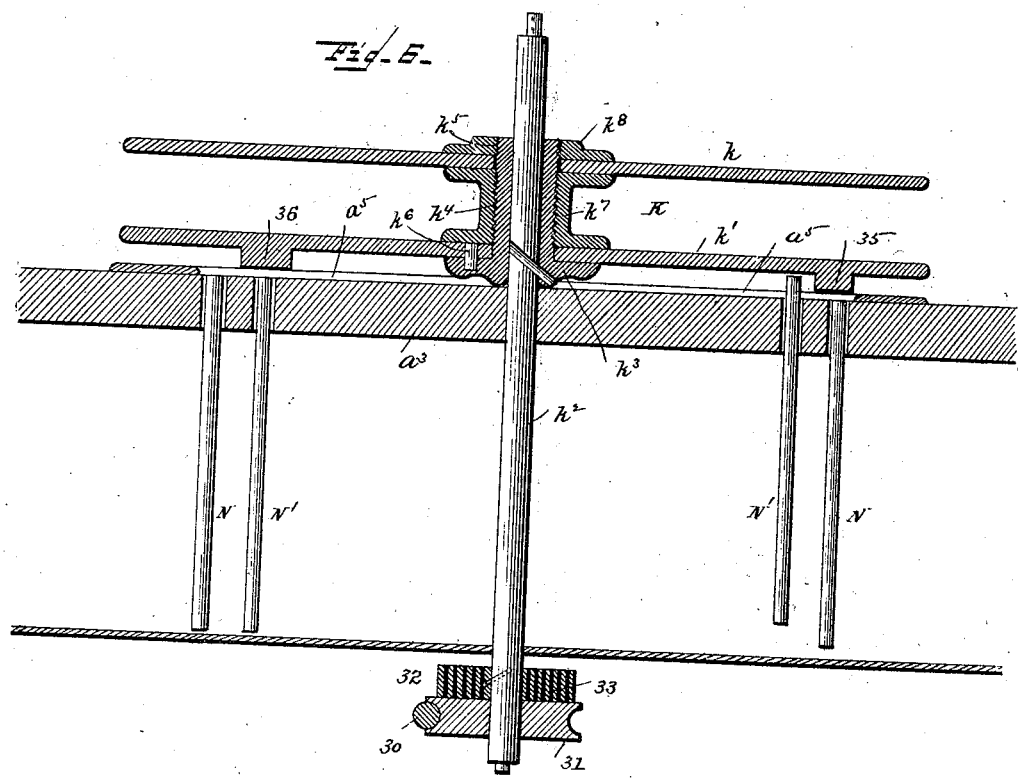
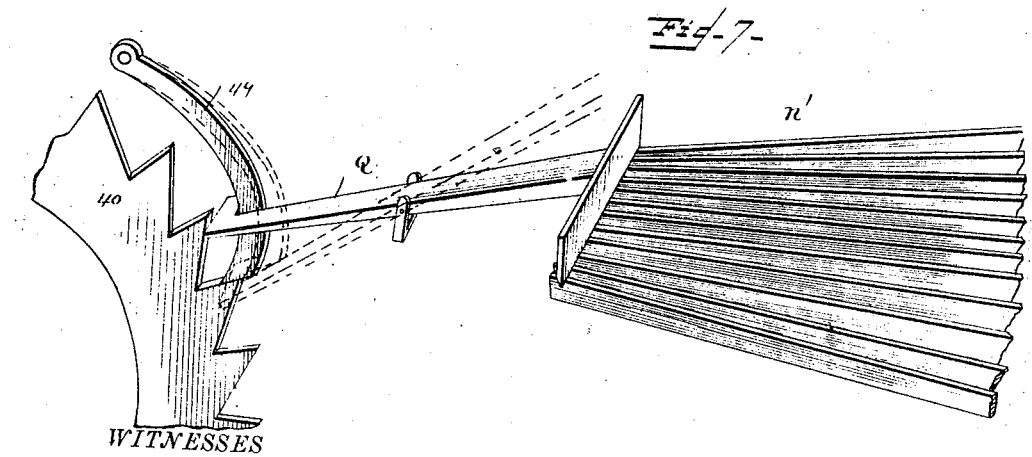
WITNESSES
Edwin L. Yewell
Wm. J. Littell
INVENTOR
David A. Murray
by J. R. Littell,
Attorney (No Model.)
D. A. MURRAY.
TYPE WRITING MACHINE.
No. 423,622. Patented Mar. 18, 1890.
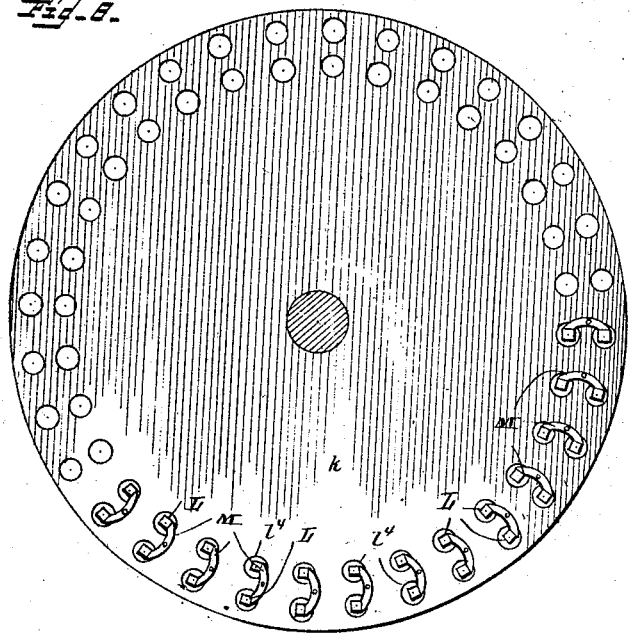
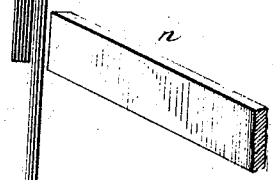
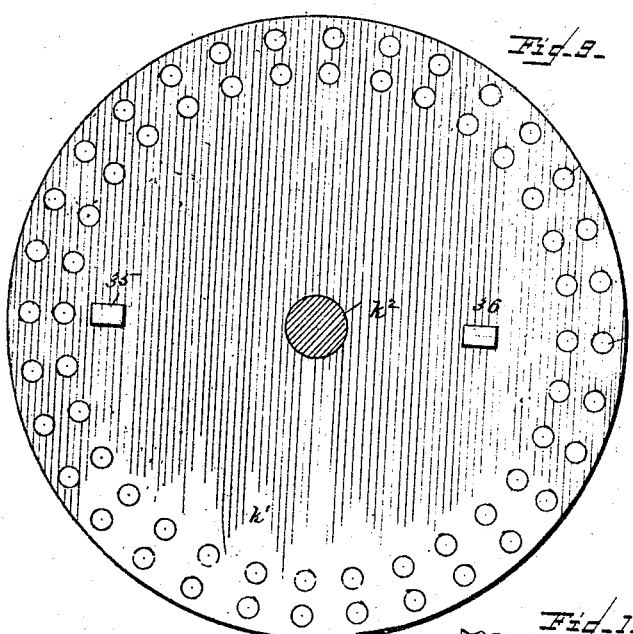
10 Sheets—Sheet 6.
WITNESSES
Edwin L. Yewell.
Wm. J. Littell.
INVENTOR
David A. Murray
by J. R. Littell,
Attorney.

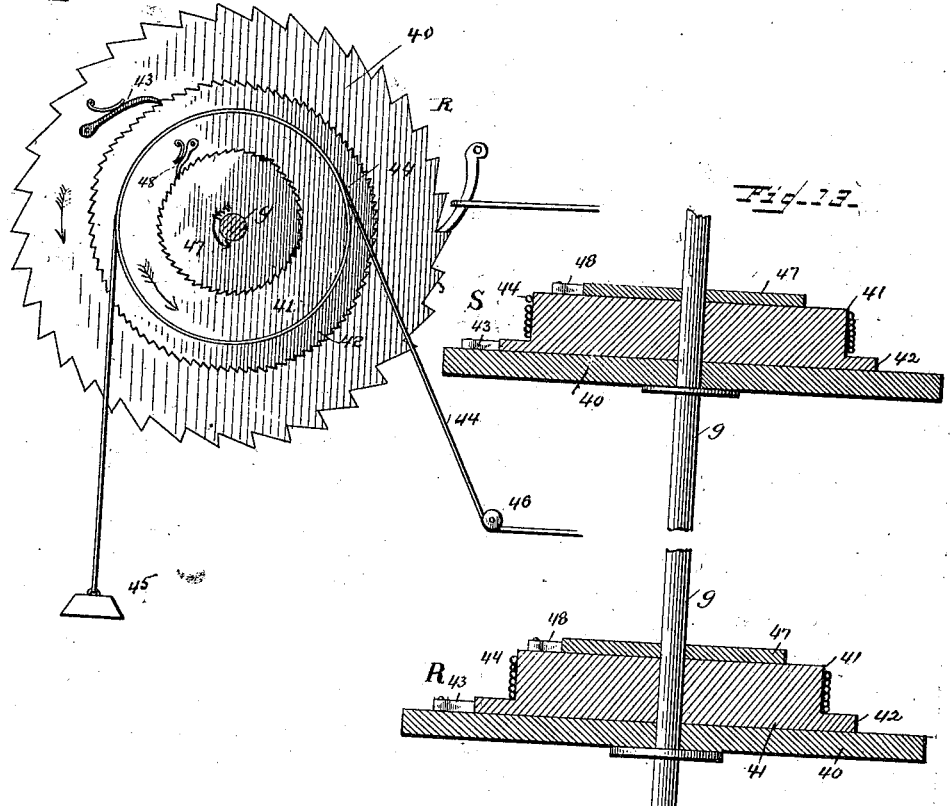

(No Model.)

D. A. MURRAY.
TYPE WRITING MACHINE.

No. 423,622.

10 Sheets—Sheet 8.

Patented Mar. 18, 1890.

WITNESSES
Edwin T. Yewell.
Wm. J. Littell,

INVENTOR
David A. Murray,
by J. R. Littell,
Attorney

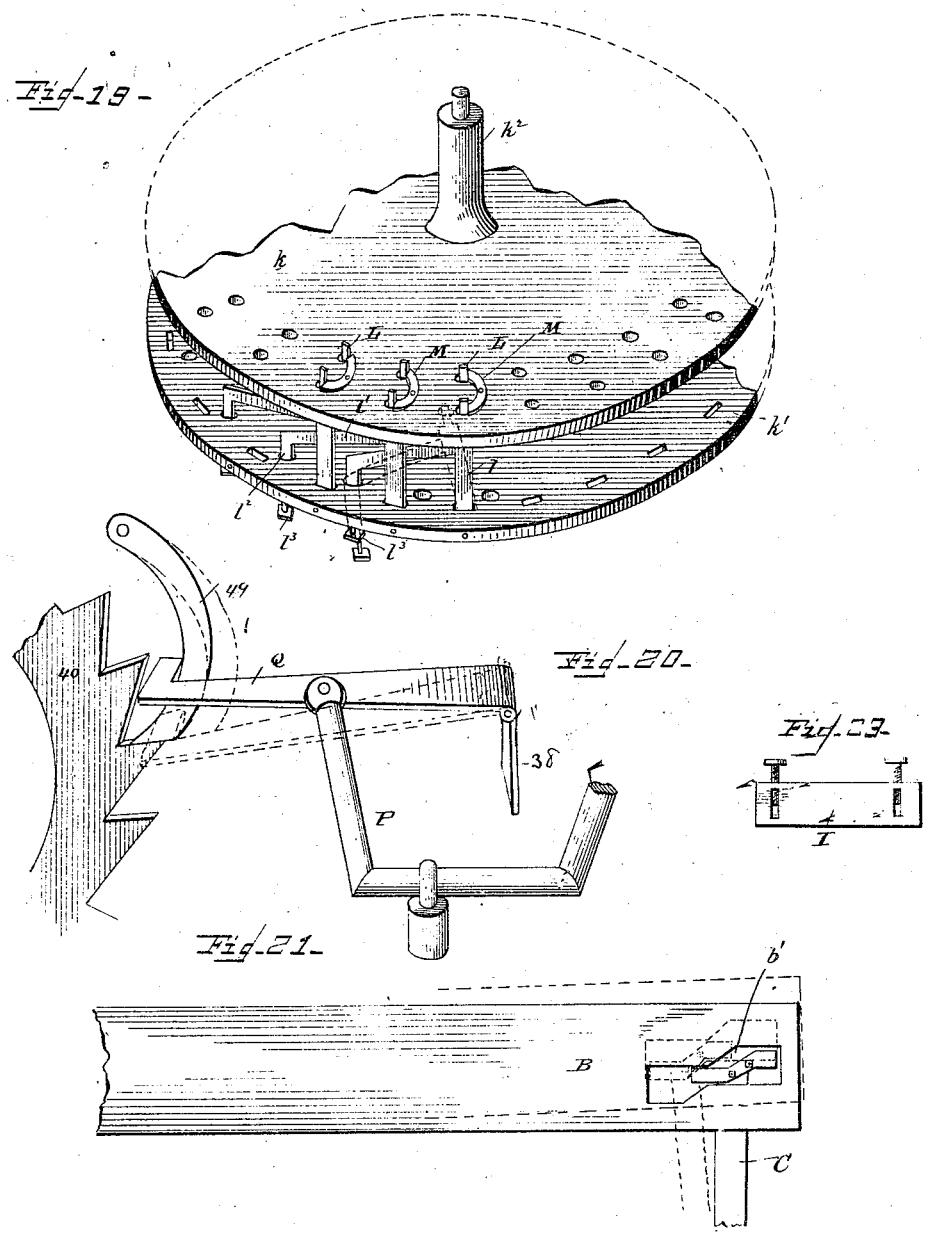

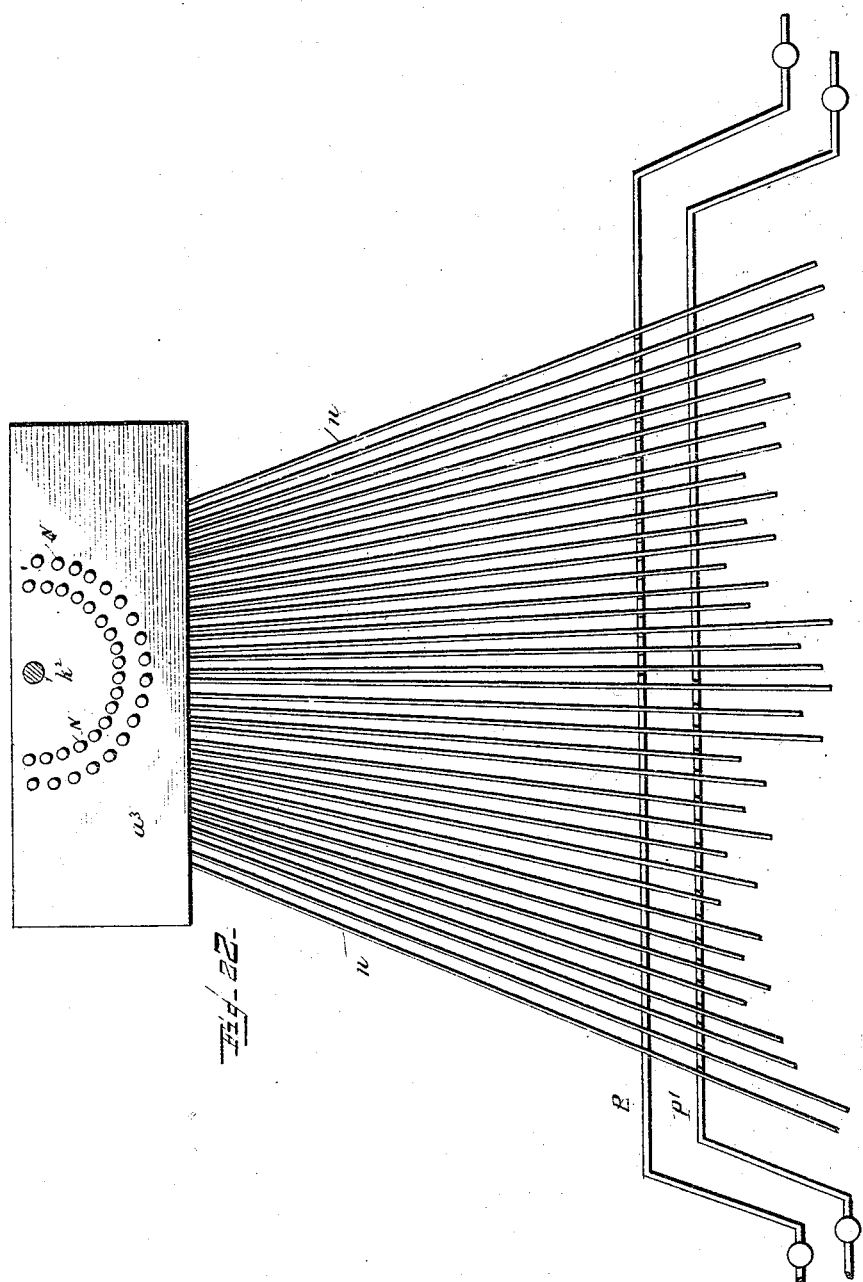

UNITED STATES PATENT OFFICE.

DAVID AMBROSE MURRAY, OF PRINCETON, NEW JERSEY.

TYPE-WRITING MACHINE.

SPECIFICATION forming part of Letters Patent No. 423,622, dated March 18, 1890.

Application filed March 3, 1888. Serial No. 266,086. (No model.)

*To all whom it may concern:*

Be it known that I, DAVID AMBROSE MURRAY, a citizen of the United States of America, residing at Princeton, in the county of Mercer and State of New Jersey, have invented certain new and useful Improvements in Type-Writing Machines, of which the following is a specification, reference being had therein to the accompanying drawings.

This invention pertains to certain new and useful improvements in type-writers, having for its object, primarily, the production of a type-writer embodying means whereby a rotating type-wheel and the operating keys or levers are relatively arranged so that pressure upon a certain key will stop the revolution of said type-wheel when the type corresponding to said key is at a given point.

A further object of the invention is the provision of simple and efficient means for revolving the type-wheel in such manner that the same can be stopped at the desired point, and by reason of its acquired momentum will effect the printing of the desired letter and at the same time the operating parts continue their movement, whereby after the printing of the said letter the type-wheel will continue in its revolution without requiring additional force to start it and at the same time avoid the strain consequent upon suddenly stopping said type-wheel.

A further object of the invention is the provision of a new and improved form of paper-carriage and means for operating the same after each printing of the type upon the paper, the movement of said paper-carriage being regulated by the removal of the type from contact with the paper.

With these and many other objects in view my invention comprises the detail construction, combination, and arrangement of parts, substantially as hereinafter fully set forth, and particularly pointed out in the claims, whereby a type-writer is produced that embodies advantages in point of simplicity, durability, and general efficiency.

Figure 17:
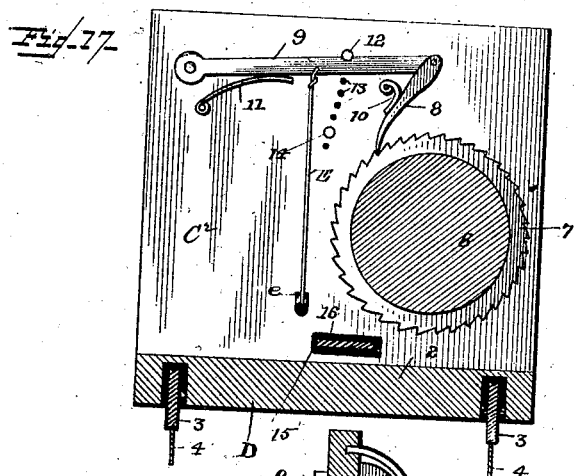
Figure 18:
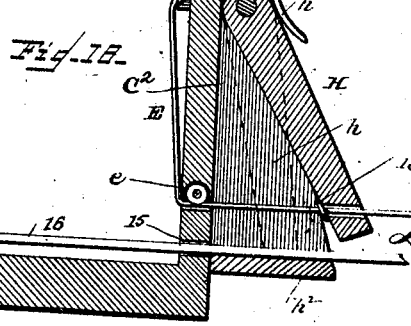

In the accompanying drawings, Figure 1 is a plan view of my invention. Fig. 2 is a front elevation thereof. Fig. 3 is a central longitudinal sectional view taken on the line $x\,x$, Fig. 1. Fig. 4 is a detail plan view showing a modified form of tripping-levers. Fig. 5 is a detail perspective view of the keys and portions of the operating-levers. Fig. 6 is a vertical sectional view of the type-wheel and a portion of its supporting-frame. Fig. 7 is a detail perspective view showing the tripping mechanism and a portion of the escapement-wheel. Figs. 8 and 9 are top and bottom plan views of the top disk of the type-wheel. Fig. 10 is an enlarged detail perspective view of one of the stopping-pins and its lever. Fig. 11 is a detail side view of the disks of the type-wheel, showing a spring-connection therein-between. Fig. 12 is a view in side elevation of one of the escapement devices or set of wheels. Fig. 13 is a sectional view of said escapement devices or wheels. Fig. 14 is an enlarged perspective view of a portion of the type-wheel, showing the type therein. Fig. 15 is an enlarged perspective view of one of the type. Fig. 16 is an enlarged plan view of the paper-carriage. Fig. 17 is a cross-sectional view thereof on the line $y\,y$, Fig. 16. Fig. 18 is an enlarged detail sectional view of one end of said paper-carriage. Fig. 19 is an enlarged perspective view of the type-wheel, showing the position occupied by the type when forced by the upper disk of the wheel. Fig. 20 is an enlarged detail view of one end of one of the bell-crank levers and a portion of one of the escapement devices, and Fig. 21 is a view showing the movable board of the paper-carriage frame. Fig. 22 is a plan view of the operating-levers. Fig. 23 is a detail view of the paper-carriage stop-bar.

Referring to the drawings, A designates the frame or table of my type-writer, the same being supported by suitable frame-work or legs connected by a cross-rod $a'$. To the frame or table are secured the side boards of what I term the "finger-board" $a^2$, the upper rear portion of which has connected thereto a flat horizontal bar $a^3$, and to the upper surface of this horizontal bar $a^3$ are connected the ends of an overhanging bar $a^4$, as shown. Upon this bar $a^3$ is secured a circularly-arranged ink-pad $a^5$.

Upon the table A, in rear of the finger-board, is disposed a movable board B, one end of which is loosely secured to said table by a short stud $b$, and its other end has formed therein a cam-like opening $b'$, wherein works a correspondingly-shaped end of a shifting-lever C, the outer end of which extends to the front end of the table A and is capable of being moved or operated by the knee of the operator. By means of this lever the movable board can be moved or shifted toward the front or rear of the table, as shown.

D is the paper-carriage, composed of two vertical end bars $C'$ $C^2$, connected at their lower ends by a bar 2 in grooves, in the under side of which are hung pulleys 3 3, designed to roll upon guide-bars 4 4, rigidly secured at their ends to upwardly-projecting bars or uprights 5 5, rigid with the movable board B. Between the uprights $C'$ $C^2$ is secured a paper roll or cylinder 6, the ends of which are journaled in said uprights; and it has secured upon one end a ratchet-wheel 7, with which engages one end of a pawl 8, pivotally secured to one end of a lever 9, fulcrumed at its rear end to the inner side of the upright $C^2$. A spring 10 bears against this pawl 8 to hold the same in engagement with the wheel 7, and a similar spring 11 bears against the under side of the lever 9 to normally hold said lever elevated against a pin or stop 12, inserted in any one of a series of holes 13 in the upright $C^2$, the downward movement of said lever 9 being limited by a similar pin or stop 14, also inserted in one of said holes 13. By means of these pins or stops the extent of the revolution of the paper wheel or cylinder is regulated.

E is a cord connected at one end to the lever 9, and is passed around a small roller $e$, hung in an opening of the upright $C^2$, and after being passed through a hole or opening in the table A is connected to one end of a treadle F, fulcrumed upon the cross-rod $a'$, for a purpose to be described. In each of these uprights $C^2$ is formed an opening 15, through which an endless belt 16 is passed, said belt being passed around a roller or wheel G, keyed upon a shaft $g$ at right angles thereto, and also around a roller or wheel $g'$, mounted between two arms $g^2$, secured to the outside of one of the vertical uprights 5, said belt being also passed through openings formed in said uprights 5 near their lower ends, as shown.

H is a spring-held arm pivotally secured between two vertical plates $h$ $h$, attached to the outer side of the upright $C^2$, and against its outer surface bears a spring $h'$, whereby said arm is normally held close to said end upright. The lower end of this spring-held arm is beveled and normally bears upon the endless belt 16, holding the same firmly against the upper side of the lower connecting-bar $h^2$ of the arms $h$, whereby a firm connection is established between the paper-carriage and the endless belt.

The cord E after being passed around the roller $e$ has secured thereon a button or stop 18, which always bears against the inner surface of the arm H over the aperture formed therein, through which said cord is passed, whereby the lever 9 has a fixed movement with relation to said arm H. A stop-bar I is secured upon the guide-bars 4 by suitable means—such as set-screws—to regulate the extent of movement of the paper-carriage. This stop-bar is shown in detail in Fig. 23.

To the upper side of the movable board B is rigidly secured the lower end of a vertical bar 20, to the upper end of which is rigidly secured a stiff sheet or thin board 21, wherein is formed between two lugs 22 22 an opening 23, immediately under which is the paper roll or cylinder 6.

J is a treadle pivotally secured upon the cross-rod $a'$ of the frame, and has connected thereto one end of a pitman 24, connected at its other end to a fly-wheel 25, around which passes an endless belt 26, which is passed around two rollers 27 27, secured in the table A, from which said belt is passed in a horizontal direction around a band-wheel or pulley 28 on the shaft of a horizontal wheel 29, and around this wheel 29 is passed a second endless belt 30.

K is a type-wheel composed, preferably, of two parallel disks $k$ $k'$, the lower one of which is rigidly secured to a vertically-disposed shaft $k^2$, extending through an aperture in the horizontal bar $a^3$, and upon its lower end said shaft has loosely secured thereon a band-wheel 31, around which is passed the endless band or belt 30. To the upper surface of this band-wheel 31 is secured a circular casing 32, wherein is disposed a long coil-spring 33, secured at one end to the shaft $k^2$ and at its other end to said band-wheel, which itself has no direct connection with said shaft save through the coil-spring. The object of this arrangement is to avoid the strain consequent upon the sudden stopping of the type-wheel, and to provide means for imparting additional force to said type-wheel when it is again set in motion, in the manner to be hereinafter described.

The lower disk $k'$ is secured to the shaft $k^2$ by means of an apertured nut $k^3$, keyed to said shaft, said nut having on its outer surface two screw-threads $k^4$ $k^5$. The disk $k'$, after being placed down upon the shouldered or flanged portion of said nut, is rigidly secured thereto by a key $k^6$. A nut $k^7$, having flanged ends, is then screwed down upon the upper surface of said disk $k'$, the thread thereof engaging the thread $k^4$, and the upper disk $k$ is then secured upon the upper flanged end of said nut $k^7$ by a nut $k^8$, the thread of which engages the thread $k^5$. From this it will be seen that the lower disk $k'$ has a rigid connection with its shaft $k^2$, while the disk $k$ is loosely connected therewith. A suitable spring 34, connected at its ends to the opposite faces of the disks $k$ $k'$, forms a connection between the same. To the under side of the lower disk $k'$ are secured or formed integral therewith two opposite downwardly-projecting lugs 35 36, formed on circles adjacent each other, the latter being within the former.

L L are two series or rows of type carried by the type-wheel, the type of each series being adjacent to each other. Each type consists of a normally-vertical bar $l$, pivotally secured at its lower end in an aperture in the lower disk $k'$ of the type-wheel, and from this bar projects an outwardly-inclined arm $l'$, having a vertical portion $l^2$ projected through a preferably circular hole in the disk $k'$, and upon its lower end is secured or cast therewith a type, as shown at $l^3$, Fig. 15. The upper ends of the bars $l$ of the type are extended through adjacent openings $l^4$ $l^4$ in the upper disk $k$, and are free to have play in said openings. A slightly-curved lever M is fulcrumed at its center about midway between the openings $l^4$ of the upper disk, the ends of which project a slight distance over said openings, as shown.

N N' are two series of circularly-arranged vertically-disposed stop-pins designed to project through correspondingly-arranged holes in the horizontal bar $a^3$. The upper ends of each series of stop-pins are designed to be on a line with the lugs 35 36, respectively, of the lower disk of the type-wheel.

To these stop-pins N N' are designed to be connected the forward ends of horizontally-disposed main operating-levers $n$, fulcrumed at about their centers on short posts $n'$, projecting from the table A, said levers being disposed under the finger-board, and converge toward their rear ends.

In the front portion of the finger-board are formed a series of openings, through which extend the connecting-necks of the operating keys or levers O, said keys being bent into an approximately V shape and fulcrumed at about their centers. The lower ends of said keys or levers O are designed to bear upon the ends of the series of levers $n$, one key or lever being provided for each of the operating-levers $n$. Upon the outer surface of each of these operating keys or levers O is indicated or stamped a letter, numeral, or punctuation-mark corresponding to the similar letter, numeral, or punctuation-mark of the type of the type-wheel. These operating keys or levers O are disposed in groups so located and arranged that each of the ten fingers of the operator will have a set or group of keys upon which to act, and thus the operator is enabled to operate all the keys without moving his hands, and in practice he can always keep his eyes upon the text from which copying, whereby greater speed and ease of operation is attained.

By depressing the outer portion of an operating key or lever O the same will, through the agency of the lever $n$, effect the elevation of the respective stop-pins N or N', according as the key operated upon may have connection with one of the inner or outer series of stop-pins, and upon so elevating said pin the respective lug 35 or 36 of the lower disk of the type-wheel will strike against or come in contact with said pin, thus stopping the movement of the type-wheel, at least its lower disk.

P P' are two bell-crank levers arranged within the finger-board under the main operating-levers $n$, and said bell-crank levers are fulcrumed at their ends at one side of the finger-board, and are also fulcrumed near their other extended ends. The outer arms 37 37 of these levers are loosely connected with the central portions of pivoted levers Q Q, which are fulcrumed at their outer ends to the sides of short posts or uprights 38 38, projecting from the table A near one side thereof.

The shaft $g$ (hereinbefore referred to) runs parallel with the table A, near one side thereof, and is secured at its ends in short posts 39 39, secured to said table, and said shaft is also projected through apertures in the posts 38' 38'. Upon this shaft $g$, adjoining each of the posts 38, are disposed the escapement devices or series of wheels R S. Each of these escapement devices is composed of a large pinion 40, loose upon shaft $g$, adjacent to which is a drum 41, having a toothed portion 42, with which engages a spring-held pawl 43, pivoted to the pinion 40, and around this drum 41, which is also loose upon the shaft $g$, is passed a cord 44, to one end of which is connected a suitable weight 45, (or it may be provided with a spring,) and the other end of said cord 44, after being passed a number of times around the drum 41, is passed around rollers or pulleys 46, attached to the table and connected to the treadle F. Adjoining each drum 41 is a second ratchet-wheel 47, rigidly secured or keyed to the shaft $g$, with which they are designed to revolve, said ratchet-wheel being also engaged by a spring-held pawl 48. Each pinion 40 is designed to engage one end of a pawl 49, fulcrumed at its other end to the adjoining post 38', and with the inner curved surface of this pawl 49 engages the outer hooked end of each lever Q. These escapement devices are exactly the same in construction, except that there are a greater number of teeth or serrations on one pinion 40 than on the other.

The levers $n$ (hereinbefore referred to) are made to rest or bear some upon the bell crank lever P and the others upon the bell crank levers P', whereby upon operating a one of the operating-keys O, causing the d pression of its respective lever $n$, one of the bell-crank levers upon which said lever $n$ bears will be depressed, causing the arm 37 thereof to operate upon the lever Q, which will effect the disengagement of the pawl 49 from one of the teeth of the pinion 40, whereby said pinion will be caused to revolve consequent upon the weighted cord 44 to the extent of one tooth of said wheel, the displacement of said pawl causing the same to occupy the position shown in Fig. 7 sufficient to permit of the partial revolution of the wheel 40, and the tooth just disengaged will come in contact with the bent end of the lever Q, causing the elevation thereof and the consequent engagement of the pawl 49 with the next tooth of the pinion 40. Immediately upon the lever Q assuming its former position the previously-depressed bell-crank lever will be elevated, as will also the front end of the lever n, which will effect the retraction of the respective stop-pin.

The object of having two or more crank-levers and escapement devices, together with the peculiar manner of drawing the paper-carriage, is to provide means for securing longer or shorter spaces between wider or narrower letters, the levers of all narrow letters being fulcrumed on one bell-crank lever and those of the wider letters on the other corresponding bell-crank lever.

From the foregoing description it will be seen that the disengagement of but one of the two series of escapement-wheels will not prevent the partial revolution of the shaft g, since if the pawl 49 of the other series is in engagement with its pinion 40 only the wheel or pinion 47 of said latter series, which is fixed firmly to the shaft, will revolve, and its spring-held pawl will slip over the teeth or serrations, dropping into a notch when it stops. The teeth or serrations of these wheels or pinions 47 of each series of escapement devices are very fine or made close together, so that when the movement of the shaft ceases both pawls 48 will be practically in engagement. Whichever of the bell-crank levers is operated upon its respective escapement devices will effect the partial revolution of the shaft g the desired distance, while each escapement device will move the shaft the distance appropriated to it.

If desired, the wheels 40 and 41 of each escapement device might be all one piece. The object in making them in the manner described and shown is that the pinion 40 will not have to be turned back in winding the weighted cord upon the drum.

It will be seen that the turning of the shaft g will effect the turning of the wheel G, and through the belt 16 will effect the movement of the paper-carriage toward said wheel G, carrying the paper under the hole or aperture 23 in the stiff sheet or board 21.

In practice motion is imparted to the type-wheel by an operator working the treadle J, which through the wheel 25, belt 26, horizontal wheel 29, and belt 30 will effect the revolution of said type-wheel and its shaft $k^2$, which wheel revolves at a rate from ten to thirty revolutions per second, except when it is checked or suddenly stopped for an instant in the manner to be described, and then the power that would naturally be communicated to the revolving type-wheel is taken up by the coil-spring 33, attached to the band-wheel 31, whereby any jar or strain upon said type-wheel is prevented when the same is suddenly stopped, and the winding up of the spring at this time will give additional force to said type-wheel, when the same is again released.

In practice the paper to be printed upon is inserted in the paper-carriage around the paper roll or cylinder, so as to occupy a normally horizontal position under the opening 23 in the stiff sheet or board 21. Motion being imparted, as above detailed, to the type-wheel and the paper being in position, the operator, by pressing upon that lever representing the type to be printed, will effect the elevation of the respective stop-pin N or N' through the agency of the levers n, which pin will instantly come in the line or path of that one of the lugs 35 or 36 of the type-wheel with which it corresponds, thereby when said lug strikes said pin stopping immediately the revolution of the lower disk of the type-wheel, and by reason of the momentum of the upper disk the same will bear tightly against the upper ends of the vertical arms l of the type L, causing the depression of the same and the forcing of the type down upon the inked pad $a^5$ or stiff sheet or board 21, while that type alone corresponding to the letter of the key depressed will project through aperture 23 and leave its impression on the paper on the roll or cylinder, immediately upon which said upper disk of the type-wheel will be brought back to its proper position by reason of the spring 34 connected thereto. Simultaneous with this last-described operation the lever n effected the depression of that one of the bell-crank levers P P' upon which it bears, causing the disengagement of the respective pawl 49 with the pinion 40, permitting of the partial revolution of the shaft g, which, through the agency of the endless belt 16, effected the movement of the type-carriage the space of one letter, so as to present the paper to the opening 23 for the impression of the second type. Upon the elevation of the outer end of the lever Q of that one of the escapement devices operated upon the bell-crank lever resumed its former position, causing the lowering of the forward end of the lever n, and consequently the retraction of the previously-elevated stop-pins, whereby the type-wheel can be started on its revolution without any additional force being required by reason of the power obtained by the winding of the spring 33. The operator continues this operation until the entire line is printed. During the movement of the paper-carriage from right to left that end of the treadle F to which the cord E and the weighted cord 44 of the escapement devices are connected was elevated, and consequently by the operator depressing the end of said treadle the lever 9, to which the cord E is connected, will be lowered into the position shown in Fig. 18, causing through the pawl 8 the revolution of the paper roll or cylinder, and the spring-held arm H is withdrawn from contact with the endless belt 16, and the carriage is then moved back over its guide-bars 4 until it comes in contact with the stop I, and at the same time the depression of the treadle F effected the rewinding of the weighted cord on the drums 41, and the device is now in the position ready for the printing of another line in a manner similar to that above detailed.

The office of the levers M, pivoted on the upper disk $k$ of the type-wheel, is that when said type-wheel is stopped in its movement, and the upper disk forces the upper ends of the vertical bars of the type forward, if either one of said type comes in contact with one of the lugs 22, as one must, one end of said lever will consequently be impaired in its movement by contact with the end of the bar of that one of the type in contact with the lugs, causing the forcing forward of the other end of said lever, which will force forward to its full extent the upper end of the bar of that one of the type which extended through the opening 23 and make its impression upon the paper. All the type save that one which it is designed to impress upon the paper strike upon the upper surface of the stiff paper or board 21 or upon the ink-pads $a^5$. The type of the inner circular series is preferably composed of capital letters and some punctuation-marks, while that of the outer series is composed in the main of small letters. The type of said latter series pass normally over the opening 23; but to provide means for printing capital letters I have made the board B movable, whereby the operator, by shifting the lever C by his knee, will shift the board B, as shown in dotted lines, Fig. 21, whereby the type of the inner series, when operated upon by the operator depressing the keys, will make other impressions upon the paper, and the adjacent type will strike, as capital letters did previously, upon one of the projections 22. To avoid printing the capital letters at an angle by reason of shifting the board B, the type thereof are preferably placed on a slight angle.

It is obvious that, if desired, I can employ in lieu of the bell-crank levers P P' for operating the escapement devices a separate lever $n'$, connected with each one of the levers $n'$, and which operate upon the tripping-lever Q', which in this instance is fulcrumed at its center, and is engaged at one end by the convergent ends of said series of levers, as shown in Figs. 4 and 7.

I claim as my invention—

1. As an improvement in type-writers, the combination of a rotatable type-wheel carrying a series of type pivotally secured thereto, means for revolving said type-wheel, and a series of operating keys or levers arranged relatively to the type of said type-wheel, substantially as set forth, whereby the revolution of said wheel will be stopped by the operation of any one of said keys or levers, and a corresponding type will be caused to print, as stated, said type being moved on their pivots when said wheel is stopped.

2. As an improvement in type-writers, the combination of the rotatable type-wheel, the series of type pivotally secured thereto, and the means for operating and stopping said wheel, substantially as set forth, said type being moved on their pivots when said wheel is stopped, and depressed by the stopping of said type-wheel, as stated.

3. As an improvement in type-writers, the revolving type-wheel carrying a series of type and having a disk loosely secured in contact with said type, whereby said type will be forced down by the momentum of said disk when said type-wheel is suddenly stopped in its movement, substantially as shown and described.

4. As an improvement in type-writers, the type-wheel having a series of type pivotally secured therein, the disk through which the upper ends of said type are passed, and the pivoted levers secured adjacent to said projecting ends of the type, whereby said type will be forced forward by the momentum of said disk when said type-wheel is suddenly stopped in its movement, substantially as shown and described.

5. As an improvement in type-writers, the type-wheel composed of two disks secured, one loosely and the other rigidly, to the revolving shaft, the type having the upper ends of their vertical bars projected through apertures in said loosely-secured disk, and having inclined arms carrying type at their outer bent ends, and the levers pivoted between said projecting ends of the bars of said type, substantially as shown and described.

6. As an improvement in type-writers, the type-wheel composed of the lower and upper disks secured rigidly and loosely, respectively, to their revolving shaft and carrying type, and the spring connecting said disks, substantially as shown and described.

7. As an improvement in type-writers, the combination of the horizontally-disposed rotatable type-wheel having a lower rigidly-secured disk provided with depending lugs, a series of pivoted type secured to said disk, and an upper loosely-secured disk in contact with said type, the vertically-disposed series of stop-pins, and the levers for operating said stop-pins, substantially as set forth.

8. As an improvement in type-writers, the combination of the type-wheel having its lower disk rigidly secured upon its shaft and provided with depending lugs, the upper disk, and the type pivoted in said lower disk and having their upper ends projected through apertures in said upper disk, the stop-pins, and the operating-levers arranged substantially as shown and described, whereby upon one of said stop-pins striking one of said lugs of the type-wheel the momentum of the upper disk will cause the depression of the type carried by said wheel, as stated.

9. As an improvement in type-writers, the combination of the main operating-levers $n'$, the bell-crank levers, the short levers Q, loosely secured upon the ends of said bell-crank levers, the shaft g, the escapements secured thereon, and the paper-carriage having an endless belt passed around said shaft, substantially as and for the purpose stated, said short levers Q being designed to engage pawls 49 of said escapements, as set forth.

10. As an improvement in type-writers, the combination, with the stand or frame having vertical guide-bars secured thereto, of the paper-carriage moving transversely of said stand or frame and having rollers bearing on said guide-bars, the endless belt passed longitudinally through and connected to said carriage, the shaft g, around which said belt is passed, the escapements secured on said shaft, and means for operating the same, substantially as set forth.

11. As an improvement in type-writers, the combination, with the stand or frame having vertical guide-bars, of the paper-carriage having a spring-held arm secured to one end thereof, the endless belt extending longitudinally through said paper-carriage and with which said arm is designed to be normally in contact, the shaft g, around which said belt is passed, the escapements secured on said shaft, and means for operating the same, substantially as set forth.

12. As an improvement in type-writers, the combination of the paper-carriage having the paper roll or cylinder provided with a ratchet-wheel and an end upright having a series of holes, a pin or stop in one of said holes, the spring-held lever carrying a pawl engaging said ratchet-wheel, the cord connected to said lever, the treadle to which the other end of said cord is connected, the endless belt, and the spring-held arm for connecting said belt and carriage and to which said cord is connected, substantially as set forth.

13. The combination, with the paper-carriage, of the cord connected thereto, the treadle to which said cord is also connected, the escapement devices having drums, over which cords are passed having weights secured to their ends and said cords attached to said treadle, substantially as shown and described.

14. As an improvement in type-writers, the combination of the rotatable type-wheel carrying a series of pivoted type and an upper loosely-secured disk, means for operating and stopping said type-wheel, the movable board, the stiff paper or board having an opening therein, the paper-carriage, the paper roll or cylinder beneath said opening, and the inking-pad, substantially as set forth, said loosely-secured disk serving to force said type downward when the wheel is suddenly stopped in its revolution, one of said type being forced through said opening, as stated.

In testimony whereof I affix my signature in presence of two witnesses.

DAVID AMBROSE MURRAY.

Witnesses:
FERGUS A. DENNIS,
FRANK G. ELLETT.